United States Patent
Drechsler et al.

(10) Patent No.: US 7,749,915 B2
(45) Date of Patent: Jul. 6, 2010

(54) PROTECTION OF POLYMER SURFACES DURING MICRO-FABRICATION

(75) Inventors: Ute Drechsler, Rueschlikon (CH); Urs T. Duerig, Rueschlikon (CH); Jane Elizabeth Frommer, San Jose, CA (US); Bernd W. Gotsmann, Horgen (CH); James Lupton Hedrick, Pleasanton, CA (US); Armin W. Knoll, Adliswil (DE); Tobias Kraus, Zurich (CH); Robert Dennis Miller, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 12/058,924

(22) Filed: Mar. 31, 2008

(65) Prior Publication Data

US 2008/0220613 A1    Sep. 11, 2008

Related U.S. Application Data

(63) Continuation of application No. 11/682,347, filed on Mar. 6, 2007, now abandoned.

(51) Int. Cl.
*H01L 21/308* (2006.01)
*H01L 21/311* (2006.01)
*H01L 21/312* (2006.01)

(52) U.S. Cl. .................. 438/725; 438/694; 438/702; 438/703; 438/717; 438/719; 438/928; 216/49; 216/72; 216/79; 257/E21.254

(58) Field of Classification Search .............. 438/725, 438/703, 694, 702, 717, 719, 928, 950; 257/E21.246, 257/E21.242, E21.254, E21.255, E21.256; 216/49, 72, 79
See application file for complete search history.

(56) References Cited

U.S. PATENT DOCUMENTS

| 4,200,463 A |   | 4/1980 | Flowers |
| 4,268,601 A | * | 5/1981 | Namiki et al. .............. 430/159 |

(Continued)

FOREIGN PATENT DOCUMENTS

EP    05405018.2    1/2005

OTHER PUBLICATIONS

Vettiger, et al.; The Millipede—More than one thousand tips for future AFM data storage; IBM Journal of Research and Development, vol. 44, No. 3, May 2000; pp. 323-340.

(Continued)

*Primary Examiner*—Mary Wilczewski
(74) *Attorney, Agent, or Firm*—Schmeiser, Olsen & Watts (57) ABSTRACT

A method of protecting a polymeric layer from contamination by a photoresist layer. The method includes: (a) forming a polymeric layer over a substrate; (b) forming a non-photoactive protection layer over the polymeric layer; (c) forming a photoresist layer over the protection layer; (d) exposing the photoresist layer to actinic radiation and developing the photoresist layer to form a patterned photoresist layer, thereby exposing regions of the protection layer; (e) etching through the protection layer and the polymeric layer where the protection layer is not protected by the patterned photoresist layer; (f) removing the patterned photoresist layer in a first removal process; and (g) removing the protection layer in a second removal process different from the first removal process.

24 Claims, 7 Drawing Sheets

U.S. PATENT DOCUMENTS

| | | | |
|---|---|---|---|
| 4,461,825 A | | 7/1984 | Kato et al. |
| 4,576,902 A | | 3/1986 | Saenger et al. |
| 5,629,132 A | * | 5/1997 | Suzuki et al. ............... 430/258 |
| 6,844,266 B2 | * | 1/2005 | Maex et al. ................ 438/714 |
| 6,849,558 B2 | | 2/2005 | Schaper |
| 2003/0219992 A1 | | 11/2003 | Schaper |
| 2004/0072098 A1 | | 4/2004 | Kozawa et al. |
| 2004/0253794 A1 | | 12/2004 | Faris |
| 2004/0266186 A1 | | 12/2004 | Brock et al. |
| 2005/0047307 A1 | | 3/2005 | Frommer et al. |
| 2005/0050258 A1 | | 3/2005 | Frommer et al. |
| 2005/0287719 A1 | * | 12/2005 | Ryu et al. .................. 438/149 |
| 2006/0054605 A1 | | 3/2006 | Huth et al. |
| 2007/0090090 A1 | * | 4/2007 | Nakaune et al. ............... 216/58 |
| 2008/0032508 A1 | * | 2/2008 | Chang ........................ 438/725 |

OTHER PUBLICATIONS

Vettiger, et al.; The Millipede—Nanotechnology Entering Data Storage; IEEE Transaction on Nanotechnology, vol. 1, No. 1, Mar. 2000; pp. 39-55.

* cited by examiner

PROTECTION OF POLYMER SURFACES DURING MICRO-FABRICATION

This application is a continuation of U.S. patent application Ser. No. 11/682,347 filed on Mar. 6, 2007 now abandoned.

FIELD OF THE INVENTION

The present invention relates to the field of micro-fabrication; more specifically, it relates a method of protecting a polymer surface during micro-fabrication of a device.

BACKGROUND OF THE INVENTION

Micro-fabrication often requires photolithographic processing and etching to form structures. However, the photolithographic process can contaminate the surfaces of underlying materials causing operability problems in the completed devices. Accordingly, there exists a need in the art to overcome the deficiencies and limitations described hereinabove.

SUMMARY OF THE INVENTION

A first aspect of the present invention is a method comprising: (a) forming a polymeric layer over a substrate; (b) forming a non-photoactive protection layer over the polymeric layer; (c) forming a photoresist layer over the protection layer; (d) exposing the photoresist layer to actinic radiation and developing the photoresist layer to form a patterned photoresist layer, thereby exposing regions of the protection layer; (e) etching through the protection layer and the polymeric layer where the protection layer is not protected by the patterned photoresist layer; (f) removing the patterned photoresist layer in a first removal process; and (g) removing the protection layer in a second removal process different from the first removal process.

A second aspect of the present invention is a method comprising: forming a polymeric layer on a top surface of substrate; forming a non-photoactive protection layer on the polymeric layer; forming a first photoresist layer on the protection layer; forming an etch stop layer on a bottom surface of the substrate; after forming the etch stop layer, removing the first photoresist layer; forming a second photoresist layer on the protection layer; exposing the second photoresist layer to actinic radiation and developing the photoresist layer to form a patterned second photoresist layer, thereby exposing regions of the protection layer; etching through the protection layer and the polymeric layer where the protection layer is not protected by the patterned second photoresist layer to expose regions of the substrate; removing the patterned second photoresist layer; forming a third photoresist layer on the protection layer; exposing the third photoresist layer to actinic radiation and developing the third photoresist layer to form a patterned third photoresist layer, thereby exposing the regions of the substrate; etching entirely through the substrate in the exposed regions of the substrate; removing the etch stop layer; removing the patterned third photoresist layer; and removing the protection layer.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

During micro-fabrication of thermo-mechanical storage devices, a media layer comprising a cross-linked polymer is formed on a substrate. The properties of this polymer must be very precisely controlled. It has been found that the application of photoresist to the media layer during fabrication of the scanner section of a thermo-mechanical storage device can alter the properties of the polymer layer because of photoresist residuals left on the surface of the polymer and that swelling of the polymer layer by aggressive photoresist organic solvents can occur. These photoresist residuals were found to remain on the media layer even after a very aggressive stripping process in boiling (220° C.) N-methylpyrrolidone (NMP). While the process described infra is described in reference to fabrication of a thermo-mechanical storage device, the invention is applicable to fabrication of other micro-devices as well and to the protection of polymer layers from photoresists in general.

Figure 1A:
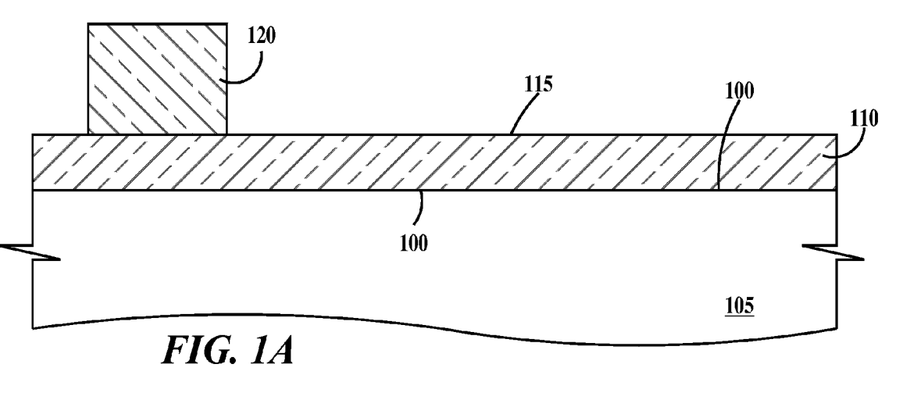
FIGS. 1A through 1N are cross-section views illustrating fabrication of a scanner substrate according to embodiments of the present invention.
Figure 1B:
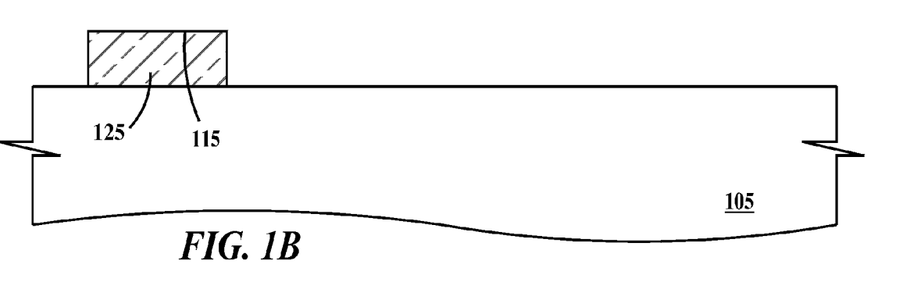
Figure 1C:
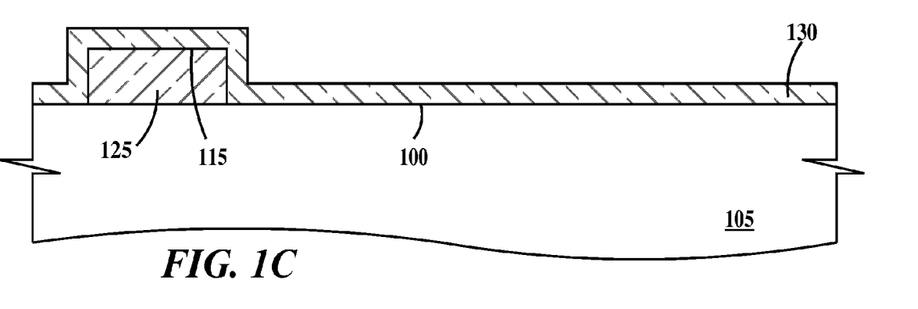
Figure 1D:
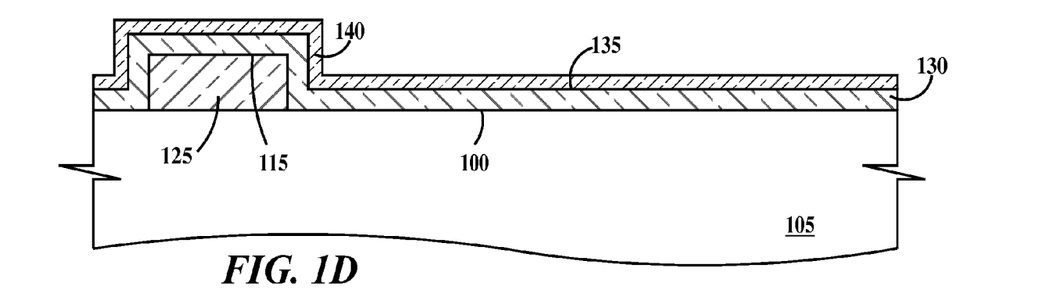
Figure 1E:
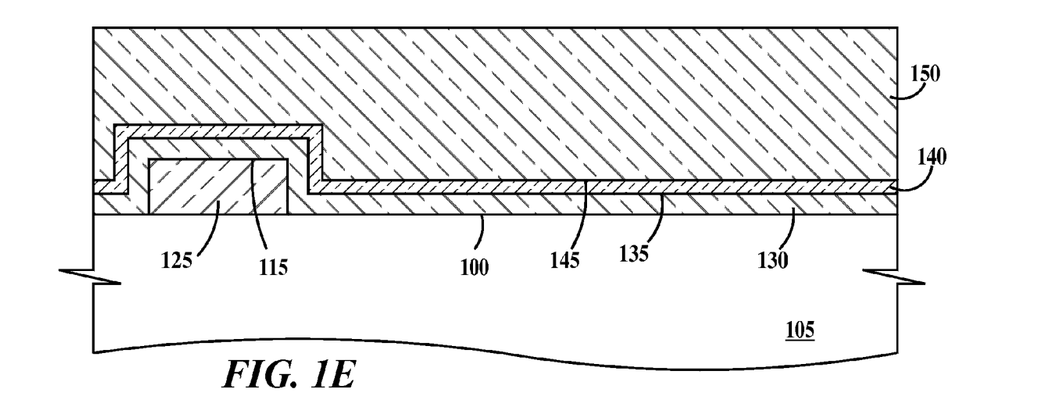
Figure 1F:
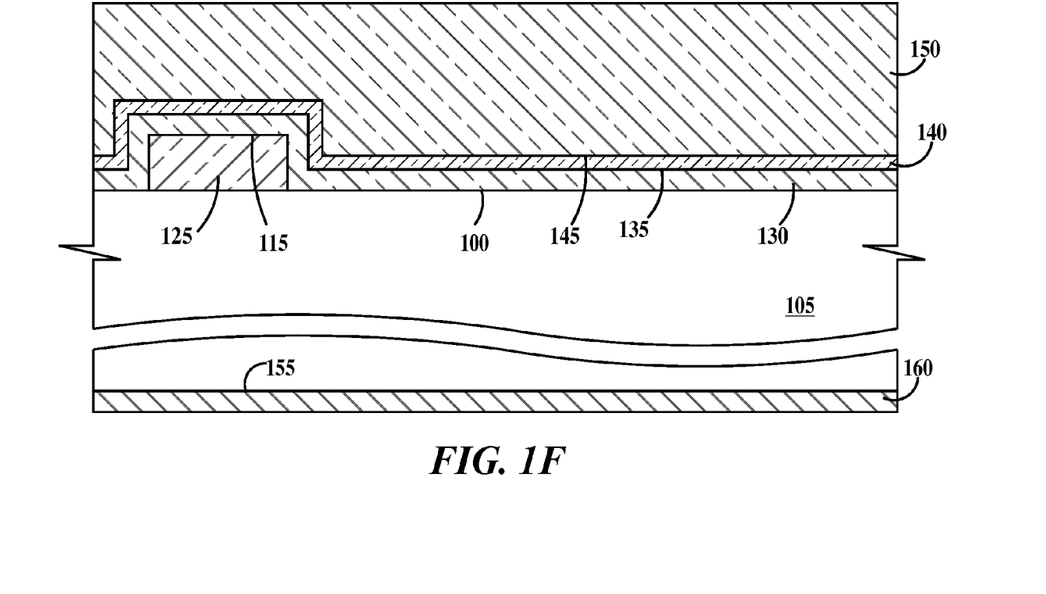
Figure 1G:
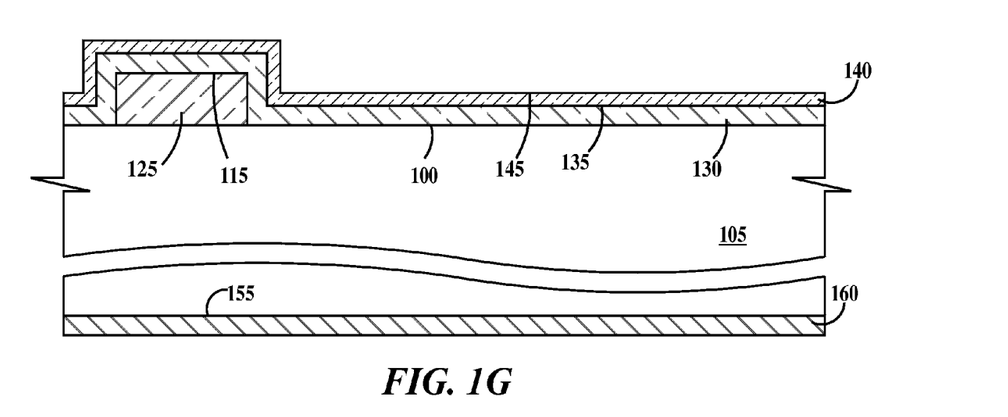
Figure 1H:
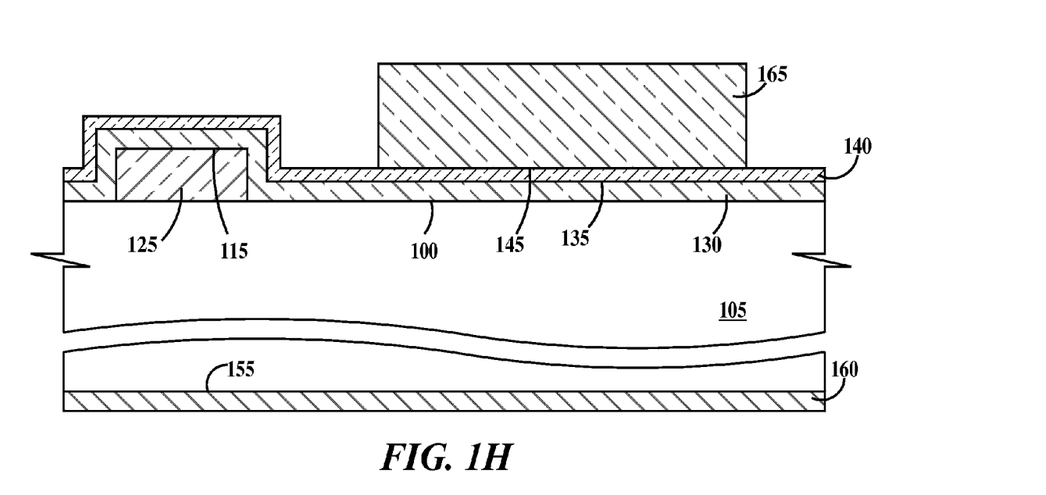
Figure 1I:
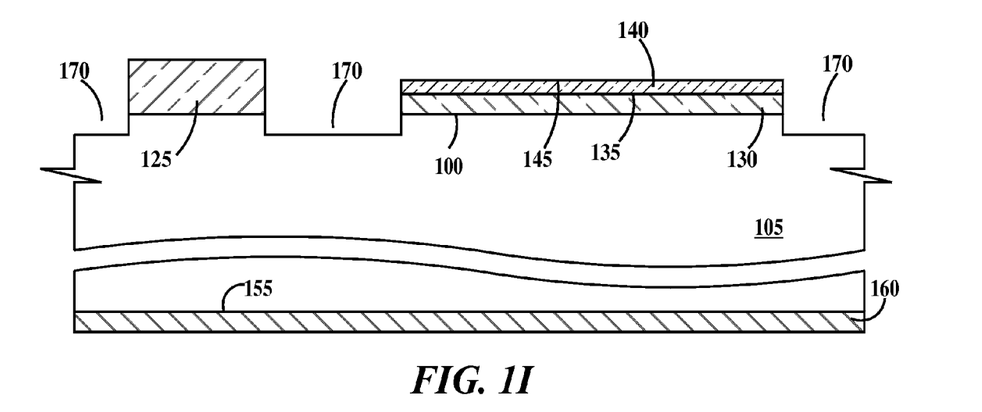
Figure 1J:
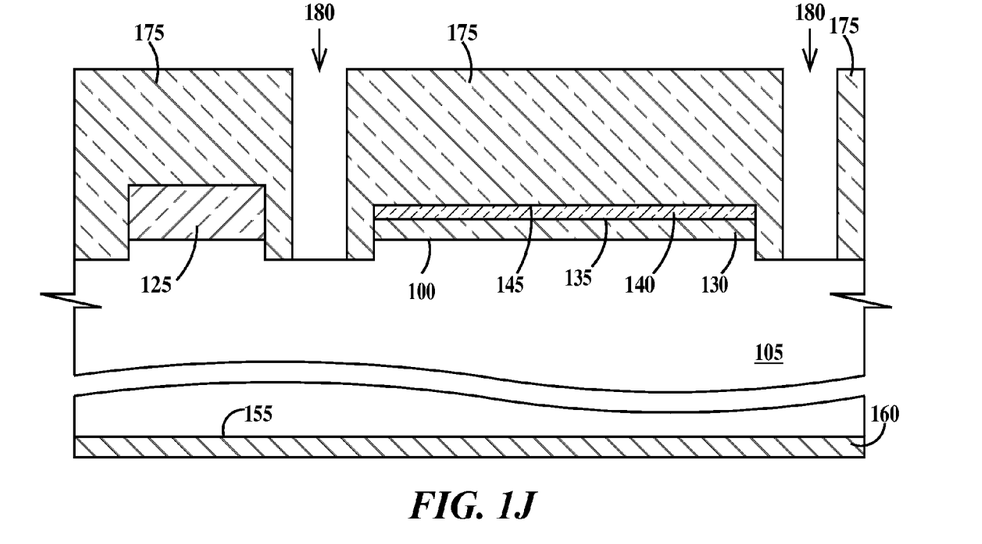
Figure 1K:
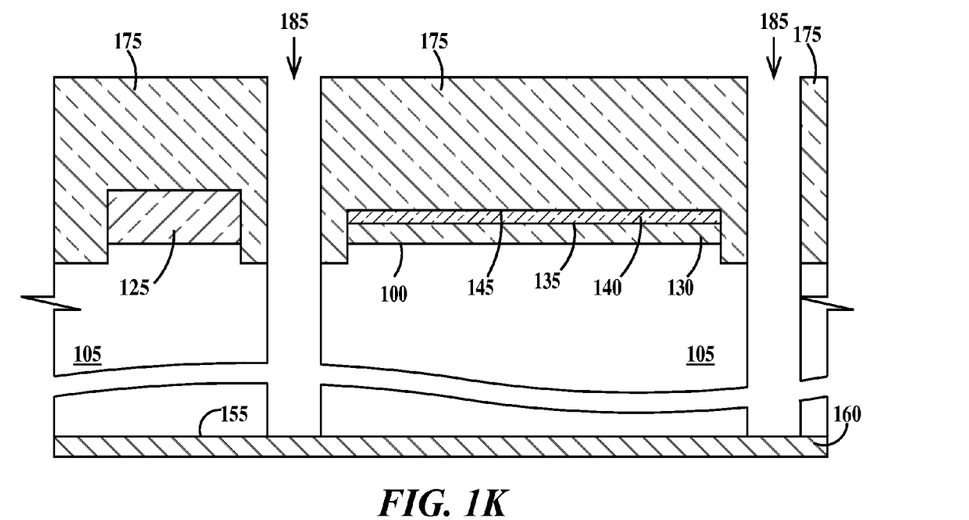
Figure 1L:
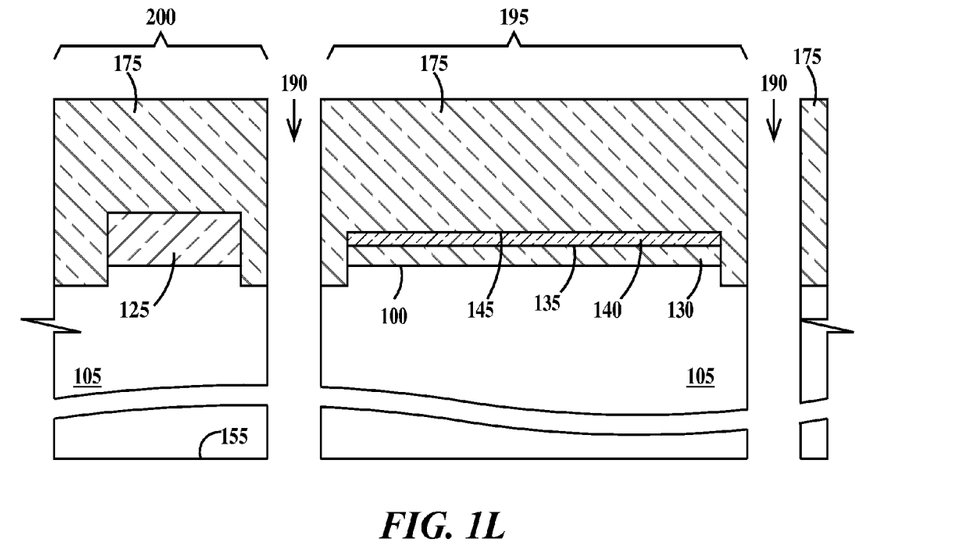
Figure 1M:
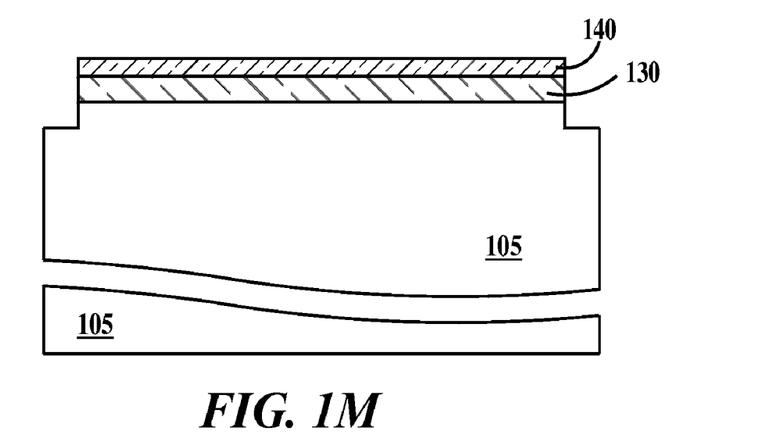
Figure 1N:
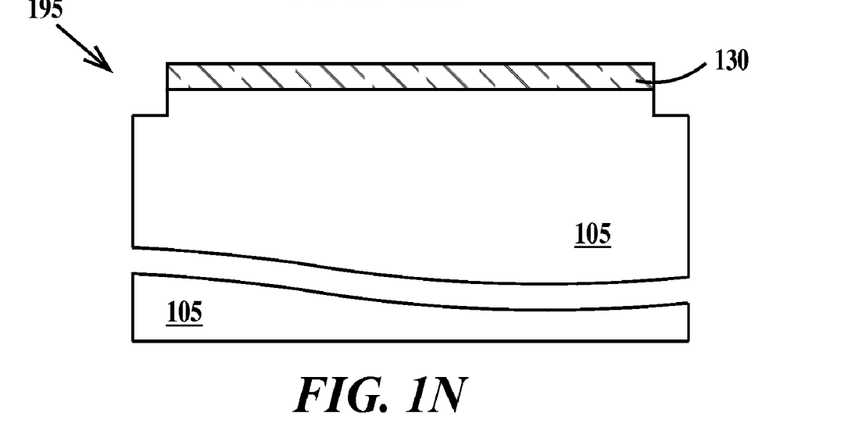

FIGS. 1A through 1N are cross-section views illustrating fabrication of a scanner substrate according to embodiments of the present invention. In FIG. 1A, formed on a top surface 100 of a silicon substrate 105 is an oxide layer 110. Formed on a top surface 115 of oxide layer 110 is a patterned photoresist layer 120. In one example, oxide layer 110 is between about 2 nm and about 50 nm thick. In one example, photoresist layer 120 comprises a positive photoresist.

In one example, when a positive photoresist is indicated it may comprise phenol-formaldehyde/diazonapththoquinone (Novalak/Diazo) based resist systems. A patterned positive photoresist layer may be formed by forming a layer of unexposed positive photoresist on a surface, exposing the photoresist layer to actinic (e.g. ultraviolet) radiation through a photomask having clear and opaque regions (to the actinic radiation). Wherever the actinic radiation strikes the photoresist layer, the photoresist will be solubilized and can be removed in an aqueous basic developer.

In FIG. 1B, oxide layer 110 (see FIG. 1A) has been removed by wet or dry etching wherever the oxide layer was not protected by photoresist layer 120 (see FIG. 1A) to form a spacer 125 and then the photoresist removed.

In FIG. 1C a cured media layer 130 is formed on top surface 100 of substrate 105, and over all exposed surfaces of spacer 125. In one example, media layer 130 may be formed by solution coating, spin coating, dip coating or meniscus coating uncured polymer formulations and performing a curing operation on the resultant coating. In one example curing is performed at a temperature greater than room temperature. In one example, curing is performed at a temperature of at least 100° C. In one example, curing is performed between a temperature of about 300° C. and about 400° C. In one example, media layer 130 has a thickness between about 10 nm and about 500 nm. The polymers for media layer 130 may be selected from the group consisting of polyarylenes, polyarylene ethers, polyarylene ether ketones, polyimides, polyazoles, polyquinolines, polyacrylates, polystyrenes, acrylate/styrene copolymers and polynorbornenes. Media layer 130 may be cross-linked by covalent bonding moieties incorporated into said polymer, hydrogen-bonding moieties incorporated into said polymer, covalent bonding moieties as endgroups of said polymer, hydrogen bonding moieties as endgroups of said polymer, by cross-linking agents added to said polymer, cross-linking agents added to the uncured polymer/solvent mixture or by combinations thereof. In one example, media layer 130 is between about 100 nm and about 120 nm thick. In one example, the polymers (before curing) of media layer 130 have molecular weights of between about 2,000 Daltons to about 20,000 Daltons.

In FIG. 1D, a media protection layer 140 is formed on a top surface 135 of media layer 130. The material for polymer protection layer advantageously is a polar polymer not easily dissolved in non-polar solvents (or even slightly polar solvents) used in positive photoresist processing such as NMP, cyclohexanone, proplyleme glycol monomethyl ether, propylene glycol monomethyl ether acetate, propylene glycol mono ethyl, or a mixture of propyl ether acetate and methyl ethyl ketone. Media protection layer is advantageously a non-photoactive material. The material for polymer protection layer is advantageously soluble in water although solubility in organic solvents that are not typically used for photoresist application and/or development is acceptable. The material for media protection layer 140 may be selected from the group consisting of polyvinyl alcohol (PVA), polydimethyl glutarimide, polyvinylacetate, polyisopropylacrylamide, polyvinyl alcohol/polyethylene copolymer, polyvinyl alcohol/polypropylene copolymer, polyhydroxybutyrate, polylactones and polylactides. In one example, media protection layer 140 is between about 300 nm and about 500 nm thick. In one example, the molecular weight of the polymers in polymer protection layer is between about 10,000 Daltons and about 1,000,000 Daltons, preferably between about 200,000 Daltons and about 800,000 Daltons, and more preferably between about 40,000 Daltons and about 300,000 Daltons.

In FIG. 1E, a topside protection layer 150 is deposited on a top surface 145 of media protection layer 140. In one example, topside protection layer is unexposed positive photoresist and is about 6 microns thick. Other materials that are dissolvable in a solvent that does not dissolve media protection layer 140 may also be used.

In FIG. 1F, a backside etch stop layer 160 is formed on a bottom surface 155 of substrate 105. In one example, backside etch stop layer comprises aluminum and is about 1.5 microns thick.

In FIG. 1G, front-side protection layer 150 (see FIG. 1F) has been removed without attacking media protection layer 140. In the event that topside protection layer 150 is unexposed positive photoresist and media protection layer 140 is PVA, the front-side protection layer may be removed by dissolution in acetone followed by an isopropyl alcohol (IPA) rinse. In one example, front side protection layer 150 may be removed by dissolution in an aqueous base. In one example front side protection layer 150 by dissolution in an organic solvent.

In FIG. 1H, a patterned photoresist layer 165 is formed over regions of top surface 145 of media protection layer 165. In one example, photoresist layer 165 comprises a positive photoresist about 6 microns thick.

In FIG. 1I, media protection layer 140 and media layer 130 have been removed by reactive ion etching (RIE) wherever the media protection layer was not protected by photoresist layer 165. The photoresist layer was then dissolved in NMP heated to about 150° C. The RIE also forms trenches 170 in substrate 105, wherever the substrate was not protected by photoresist or spacer 125. In one example, the RIE process used a mixture of $SF_6$ and $C_4F_8$ in a first step and $O_2$ in a second step.

In FIG. 1J, a patterned photoresist layer 175 having openings 180 is formed over substrate 105. Substrate 105 is exposed in the bottom of openings 180. Photoresist layer 175 covers media protection layer 140 and spacer 125.

In FIG. 1K, an RIE process is performed to form trenches 185 by extending openings 180 in substrate 105 wherever the substrate was not protected by photoresist. Backside etch stop layer 160 is exposed in the bottom of trenches 185. In one example, the RIE process used a mixture of $SF_6$ and $C_4F_8$ in a first step and $O_2$ in a second step.

Figure 2:
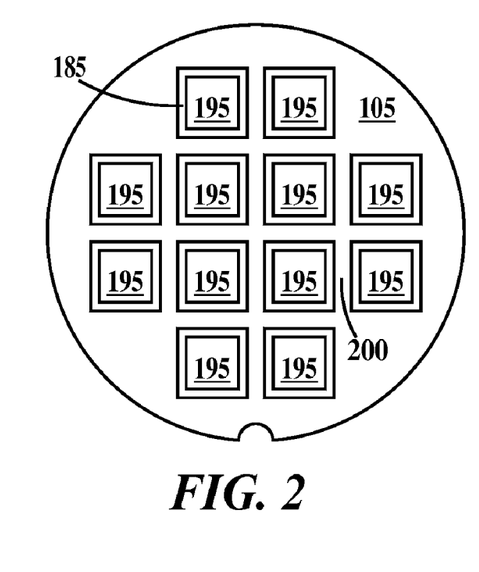
FIG. 2 is a top view of illustrating singulation of multiple scanner substrates from a single substrate.

In FIG. 1L, backside etch stop layer 160 (see FIG. 1K) is removed. In the event backside etch stop layer 160 is aluminum, a 50° C. mixture of $H_3PO_4$:$HNO_3$:$H_2O$ etchant may be used. Removal of backside etch stop layer 160 forms individual scanners 195 surrounded by a grid 200 as illustrated in FIG. 2 and described infra. The individual scanners can be separated from grid 200.

In FIG. 1M, photoresist layer 175 (see FIG. 1L) is removed from each scanner 195. In the event media protection layer 140 is PVA, photoresist layer 175 may be removed by dissolving the photoresist layer in NMP heated to between about 150° C. and about 200° C.

In FIG. 1N, media protection layer 140 (see FIG. 1M) is removed. In the event media protection layer 140 is PVA, the media protection layer may be removed by dissolving the media protection layer in 50° C. water.

FIG. 2 is a top view illustrating singulation of multiple scanner substrates 195 from a single substrate 105. In FIG. 2, individual scanners 195 are singulated from substrate 105 by trenches 185.

Figure 3:
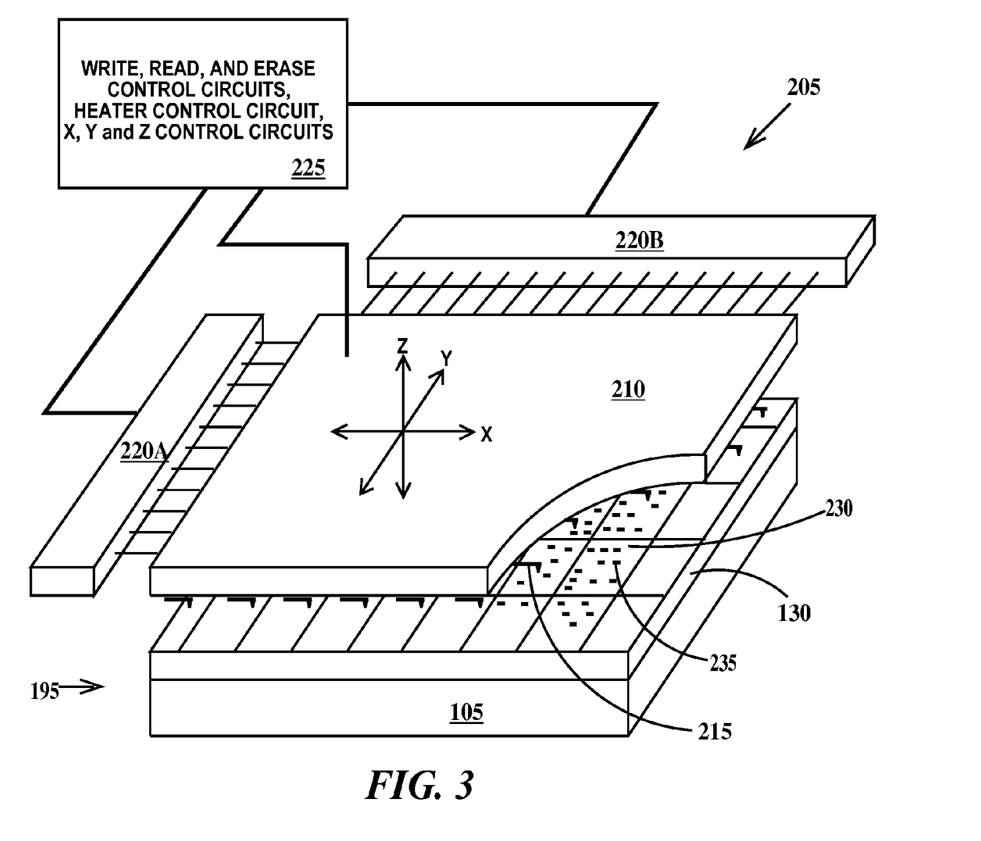
FIG. 3 is an isometric view of a local storage unit including the scanner substrate described in FIGS. 1A through 1N.

FIG. 3 is an isometric view of a local storage unit 205 including scanner substrate 195 described supra. In FIG. 3, a storage unit 205 includes a scanner substrate 195 including substrate 105 and storage media layer 130 which acts as the data-recording layer. An optional tip penetration stop layer may be formed between storage media layer 130 and substrate 105. Positioned over storage media layer 130 is a probe assembly 210 including an array of probe tip assemblies 215 each having a selectably heatable probe tip. Probe assembly 210 may be moved in the X, Y and Z directions relative to substrate 105 and storage media layer 130 by any number of devices as is known in the art. Switching arrays 220A and 220B are connected to respective rows (X-direction) and columns (Y-direction) of probe tip assemblies 215 in order to allow addressing of individual probe tip assemblies. Switching arrays 220A and 220B are connected to a controller 225 which includes a write control circuit for independently writing data bits with each probe tip assembly 215, a read control circuit for independently reading data bits with each probe tip assembly 215, an erase control circuit for independently erasing data bits with each probe tip assembly 215, a heat control circuit for independently controlling each heater of each of the probe tip assembles 215, and X, Y and Z control circuits for controlling the X, Y and Z movement of probe assembly 210. The Z control circuit controls a contact mechanism (not shown) for contacting the storage media layer 130 with the tips of the array of probe tip assemblies 215.

During a write operation, probe assembly 210 is brought into proximity to storage media layer 130 and probe tip assemblies 215 are scanned relative to the storage media layer. Each of the probe tip assemblies 215 writes only in a corresponding region 230 of storage media layer 130. Indentations 235 are formed by pressing selected heated probe tips of probe tip assemblies 215 into storage media 130.

During a read operation, probe assembly 210 is brought into proximity to storage media layer 130 and probe tip assemblies 215 are scanned relative to the media layer. Indentations 235 are detected by scanning the probe tip of probe tip assemblies 215 over storage media layer 130. Each of the probe tip assemblies 215 reads only in a corresponding region 230 of storage media layer 130.

During an erase operation, probe assembly 210 is brought into proximity to storage media layer 130, and probe tip assemblies 215 are scanned relative to storage media layer 130. Indentations 230 are erased by locally heating the storage media layer with probe tips of selected probe tip assemblies 215 to allow the polymer of the storage media layer to flow. Each of the probe tip assemblies 215 reads only in a corresponding region 235 of storage media layer 130.

Additional details relating to data storage devices described supra may be found in the articles "*The Millipede— More than one thousand tips for future AFM data storage,*" P. Vettiger et al., *IBM Journal of Research and Development*. Vol. 44 No. 3, May 2000 and "*The Millipede—Nanotechnology Entering Data Storage,*" P. Vettiger et al., *IEEE Transaction on Nanotechnology*, Vol. 1, No, 1, March 2002. See also United States Patent Publication 2005/0047307, Published Mar. 3, 2005 to Frommer et al. and United States Patent Publication 2005/0050258, Published Mar. 3, 2005 to Frommer et al., both of which are hereby included by reference in there entireties.

PROCESS EXAMPLE

The media layer selected was a polyarylether ketone polymer containing additional acetylenic functionality for thermal, photochemical or ionizing radiation crosslinking. The polymer contained about 15 monomer units on average yielding a molecular weight of about 4,000 Daltons. A 5 weight % solution of the polymer using cyclohexanone solvent was used for spin coating a 100 nm thick polymer film on a silicon wafer. The polymer film was cured for 1 hour in a nitrogen atmosphere at 380 C in order to activate the cross-linking reaction between the ethynyl moieties of the polyarylether ketone.

Poly-vinyl-alcohol with molecular weight of about 72,000 Daltons, purchased from Fluka, was dissolved in purified water to form a 5% by weight solution. The solution was spin coated onto the media layer to form a 300 nm thick media protection layer after curing (30 minutes at 90° C.). The PVA media protection layer remained on the polymer throughout all processing steps involving repeated formation and removal of positive photoresist layers as described supra.

The most demanding process in terms of the media protection layer is the RIE of the substrate. A 10 micron thick patterned positive photoresist layer was formed by spin casting, exposing the photoresist layer using broadband UV-light and developing the photoresist layer in dilute aqueous KOH. The RIE was performed using an Alcatel Vacuum Technol AMS2000 tool using $SF_6$ and $C_4F_8$ in a first step and $O_2$ in a second step with a total etch time of about 90 minutes. The photoresist layer was removed by dissolution in NMP heated to about 150° C. Note that the media layer was still protected by the PVA layer.

The PVA layer was removed by means of a simple hot water rinse. SEM examinations of the surface of the media layer before and after PVA application and removal showed a surface as clean as originally formed and significantly cleaner than a SEM of a media layer that had been exposed to the photoresist directly (a similar process but omitting the PVA).

Further, an optional cleaning of the exposed media layer was performed in NMP heated to about 150° C. in order to remove traces of non water-soluble residues resulting in an ultra-clean polymer media surface.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method comprising:
   (a) forming a polymeric layer over a substrate;
   (b) forming a non-photoactive protection layer over said polymeric layer;
   (c) forming a photoresist layer over said protection layer;
   (d) exposing said photoresist layer to actinic radiation and developing said photoresist layer to form a patterned photoresist layer, thereby exposing regions of said protection layer;
   (e) etching through said protection layer and said polymeric layer where said protection layer is not protected by said patterned photoresist layer;
   (f) removing said patterned photoresist layer in a first removal process; and
   (g) removing said protection layer in a second removal process different from said first removal process.

2. The method of claim 1, further including:
   repeating steps (c), (d) (e) and (f) with at least one additional photoresist layer.

3. The method of claim 2, wherein said photoresist layers are positive photoresists.

4. The method of claim 1, wherein said protection layer comprises polyvinyl alcohol.

5. The method of claim 1, wherein said removing said protection layer comprises dissolving the protection layer in water.

6. The method of claim 1, wherein said first removal processes uses an organic solvent and said second removal process uses water.

7. The method of claim 1, wherein said first removal processes uses an non-polar solvent and said second removal process uses a polar solvent.

8. The method of claim 1, wherein step (a) includes thermally curing said polymeric layer at a temperature greater than room temperature to cross-link polymers of said polymeric layer.

9. The method of claim 1, further including etching into or through said substrate in regions exposed by said etching through said polymeric layer.

10. The method of claim 1, wherein said polymeric layer comprises a polymer selected from the group consisting of polyarylenes, polyarylene ethers, polyarylene ether ketones, polyimides, polyazoles, polyquinolines, polyacrylates, polystyrenes, acrylate/styrene copolymers and polynorbornenes.

11. The method of claim 10, wherein said polymeric layer is cross-linked by covalent bonding moieties incorporated into said polymer, hydrogen-bonding moieties incorporated into said polymer, covalent bonding moieties as endgroups of said polymer, hydrogen bonding moieties as endgroups of said polymer, by cross-linking agents added to said polymer, or by combinations thereof.

12. The method of claim 1, wherein said protection layer comprises a material selected from the group consisting of polyvinyl alcohol, polydimethyl glutarimide, polyvinylacetate, polyisopropylacrylamide, polyvinyl alcohol/polyethylene copolymer, polyvinyl alcohol/polypropylene copolymer, polyhydroxybutyrate, polylactones and polylactides.

13. A method comprising:
forming a polymeric layer on a top surface of substrate;
forming a non-photoactive protection layer on said polymeric layer;
forming a first photoresist layer on said protection layer;
forming an etch stop layer on a bottom surface of said substrate;
after forming said etch stop layer, removing said first photoresist layer;
forming a second photoresist layer on said protection layer;
exposing said second photoresist layer to actinic radiation and developing said photoresist layer to form a patterned second photoresist layer, thereby exposing regions of said protection layer;
etching through said protection layer and said polymeric layer where said protection layer is not protected by said patterned second photoresist layer to expose regions of said substrate;
removing said patterned second photoresist layer;
forming a third photoresist layer on said protection layer;
exposing said third photoresist layer to actinic radiation and developing said third photoresist layer to form a patterned third photoresist layer, thereby exposing said regions of said substrate;
etching entirely through said substrate in said exposed regions of said substrate;
removing said etch stop layer;
removing said patterned third photoresist layer; and
removing said protection layer.

14. The method of claim 13, wherein said first photoresist layer, said second photoresist layer, said third photoresist layer or combinations thereof independently comprise positive photoresist.

15. The method of claim 13, wherein said protection layer comprises polyvinyl alcohol.

16. The method of claim 13, wherein said removing said protection layer comprises dissolving the protection layer in water.

17. The method of claim 13, wherein said patterned second and said patterned third photoresist layers are removed by dissolution in an organic solvent.

18. The method of claim 13, further including:
after said forming said polymeric layer and before said forming said protection layer, thermally curing said polymeric layer at a temperature greater than room temperature to cross-link polymers of said polymeric layer.

19. The method of claim 13, wherein said polymeric layer comprises a polymer selected from the group consisting of polyarylenes, polyarylene ethers, polyarylene ether ketones, polyimides, polyazoles, polyquinolines, polyacrylates, polystyrenes, acrylate/styrene copolymers and polynorbornenes.

20. The method of claim 19, wherein said polymeric layer is cross-linked by covalent bonding moieties incorporated into said polymer, hydrogen-bonding moieties incorporated into said polymer, covalent bonding moieties as endgroups of said polymer, hydrogen bonding moieties as endgroups of said polymer, by cross-linking agents added to said polymer, or by combinations thereof.

21. The method of claim 13, wherein said protection layer comprises a material selected from the group consisting of polyvinyl alcohol, polydimethyl glutarimide, polyvinylacetate, polyisopropylacrylamide, polyvinyl alcohol/polyethylene copolymer, polyvinyl alcohol/polypropylene copolymer, polyhydroxybutyrate, polylactones and polylactides.

22. The method of claim 13, wherein said first photoresist layer is removed by dissolution in an aqueous base.

23. The method of claim 13, wherein said first, patterned second and patterned third photoresist layers are removed by dissolution in an organic solvent.

24. A method comprising:
forming a polymeric layer on a top surface of substrate;
thermally curing said polymeric layer at a temperature greater than room temperature to cross-link polymers of said polymeric layer;
after said thermally curing said polymeric layer, forming a non-photoactive protection layer on said polymeric layer;
forming a first photoresist layer on said protection layer;
forming an etch stop layer on a bottom surface of said substrate;
after forming said etch stop layer, removing said first photoresist layer;
forming a second photoresist layer on said protection layer;
exposing said second photoresist layer to actinic radiation and developing said photoresist layer to form a patterned second photoresist layer, thereby exposing regions of said protection layer;
etching through said protection layer and said polymeric layer where said protection layer is not protected by said patterned second photoresist layer to expose regions of said substrate;
removing said patterned second photoresist layer;
forming a third photoresist layer on said protection layer;
exposing said third photoresist layer to actinic radiation and developing said third photoresist layer to form a patterned third photoresist layer, thereby exposing said regions of said substrate;
etching entirely through said substrate in said exposed regions of said substrate;
removing said etch stop layer;
removing said patterned third photoresist layer;
removing said protection layer;
wherein said first photoresist layer, said second photoresist layer, said third photoresist layer or combinations thereof independently comprise positive photoresist;
wherein said removing said protection layer comprises dissolving the protection layer in water;
wherein said polymeric layer comprises a polymer selected from the group consisting of polyarylenes, polyarylene ethers, polyarylene ether ketones, polyimides, polyazoles, polyquinolines, polyacrylates, polystyrenes, acrylate/styrene copolymers and polynorbornenes;
wherein said polymeric layer is cross-linked by covalent bonding moieties incorporated into said polymer, hydrogen-bonding moieties incorporated into said polymer, covalent bonding moieties as endgroups of said polymer, hydrogen bonding moieties as endgroups of said polymer, by cross-linking agents added to said polymer, or by combinations thereof;
wherein said protection layer comprises a material selected from the group consisting of polyvinyl alcohol, polydimethyl glutarimide, polyvinylacetate, polyisopropylacrylamide, polyvinyl alcohol/polyethylene copolymer, polyvinyl alcohol/polypropylene copolymer, polyhydroxybutyrate, polylactones and polylactides;
wherein said first photoresist layer is removed by dissolution in an aqueous base; and wherein said patterned second and patterned third photoresist layers are removed by dissolution in an organic solvent.

* * * * *